Jan. 20, 1925.

H. G. CORDLEY ET AL

RECIPROCATING PLUG FAUCET

Filed Jan. 14, 1922

1,523,757

Inventors
H.G. CORDLEY &
Geo. R. LONG.

By A. P. Greeley

Attorney

Patented Jan. 20, 1925.

1,523,757

UNITED STATES PATENT OFFICE.

HENRY G. CORDLEY, OF GLEN RIDGE, NEW JERSEY, AND GEORGE R. LONG, OF WATERBURY, CONNECTICUT.

RECIPROCATING-PLUG FAUCET.

Application filed January 14, 1922. Serial No. 529,214.

*To all whom it may concern:*

Be it known that we, HENRY G. CORDLEY, a citizen of the United States, residing at Glen Ridge, county of Essex, and State of New Jersey, and GEORGE R. LONG, a citizen of the United States, residing at Waterbury, county of New Haven, and State of Connecticut, have invented certain new and useful Improvements in Reciprocating-Plug Faucets, of which the following is a specification, reference being had to the accompanying drawings, forming a part thereof.

Our invention relates to faucets of the reciprocating plug type adapted for controlling the flow of liquid from tanks or other receptacles and has for its object to provide a faucet of this type which will be simple and inexpensive in construction, easily taken apart for cleaning and not liable to get out of order.

A further object of the invention is to provide a faucet composed of few parts and in which the main parts may be formed from drawn tubing and will require little or no machining.

With the objects above indicated and other objects hereinafter explained in view, our invention consists in the construction and combination of elements hereinafter described and claimed.

Referring to the drawings.

Figure 1:
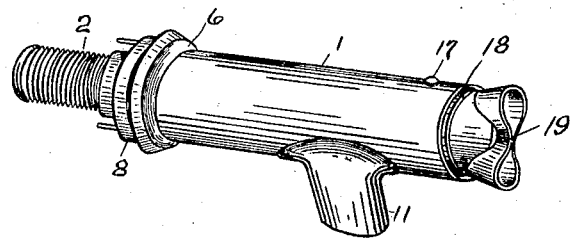
Figure 1 is a perspective view of a faucet embodying our invention.

In the drawings 1 indicates the outer or forward member of the faucet body, 2 indicates the inner or rear member of the faucet body and 3 indicates the plug which fits within the outer end of the outer member.

The outer or forward member 1 is formed of a straight piece of tubing of relatively large diameter having its inner or rear end turned inward to form a flange 4 adapted to fit on and be secured to the inner member 2 about midway of its length. The inner or rear member 2 is formed of a straight piece of tubing of less diameter than the other member arranged to extend forward into the outer member to a point about midway of its length, its end being cut off at right angles to its axis to form a seat 5 for the flat washer. On the inner member in rear of and preferably against the flange 4 of the outer member is secured a disk 6 provided on its rear side with a gasket or washer 7 to fit against and make close contact with the outer face of the wall of the tank with which the faucet is used. In rear of this disk the inner member is screw-threaded to receive a nut 8 adapted to hold a gasket or washer 9 against the inner face of the wall of the tank.

Forward of the end 5 of the inner member 2 the outer member is provided on its under side with a discharge opening 10 preferably surrounded by a downwardly extending spout 11 secured to the outer member.

The plug 3 is formed of a straight piece of tubing of such exterior diameter as to fit the interior diameter of the outer member 1 and to be adapted to rotate and slide within it. At its rear end the plug is closed to form a head 12 to which is secured in any convenient manner, as by a rivet 13, a washer 14 consisting of a flat disk of non-metallic material such as the vulcanized fibre commonly used for the washers of household water supply faucets, of a diameter preferably somewhat less than the diameter of the interior of the outer tube, but of substantially greater diameter than the diameter of the inner member 2 so that its rear face is adapted to bear against the end 5 at a substantial distance within its periphery.

In the walls of the plug are formed oppositely arranged longitudinal slots 15 extending from near the rear end of the plug forward and communicating at their forward ends with slots 16 extending in a direction around the plug at a slight angle to a plane at right angles to the axis of the plug. A removable pin 17 carried by the outer member extends through the slots, the arrangement being such that when the plug is pushed to the rear until the washer 14 bears against the end 5 of the inner member, the sides of the inclined slots 16 will engage the pin 17 and rotation of the plug will cause the plug to move rearward to force the washer against the end 5 and thus close the faucet, the sides of the inclined slots 16 thus acting as cams and the slots and the pin 17 having substantially the effect of screwthreads and constituting what may be termed a bayonet joint connection.

The plug 3 may be provided at its outer end with any convenient handle for rotating and reciprocating it. An inexpensive form of handle may be formed as shown by cutting part way through the plug from opposite sides near its forward end as shown at 18, and forcing the sides of the portions 19 outside the cut inward as shown, thus causing the ends of these portions 19 to be flared outward and forming a convenient finger hold.

When the faucet is closed any liquid which is in the space between the outer surface of the inner member 2 and the inner surface of the outer member 1 will drain out through the discharge opening 10, the washer 14 being of such diameter as to permit any such liquid to flow past it.

As the washer 14 bears with its rear face against the end 5 of the rear member a tight joint is readily made without the necessity of machining a valve seat or a valve, and a tight closure will continue to be made until the washer is cut completely through and probably after that, as the portion of the washer within the line of the cut formed by the end 5 would then serve as a plug. The washer should, however, be replaced before it is completely cut through. This may be readily done by removing the rivet 13 or other fastening means and securing a fresh washer in place. For the purpose of removing and replacing the washer readily the rivet 13 is preferably a tubular or hollow rivet as shown in Figure 7.

The portions 16 of the slots in the plug may, if preferred, be formed at right angles to the portions 15, in which case they will serve, in cooperation with the pin 17, to lock the plug after it has been pushed rearward to force the washer 14 carried by it against the end 5 of the inner member. The pin 17 is preferably provided with a slit 25 extending from its lower end upward about half its length and the portions separated by the slit are sprung slightly outward so as to cause the pin to be retained by friction in the hole in the outer member 1 into which it enters.

Figures 2, 7:
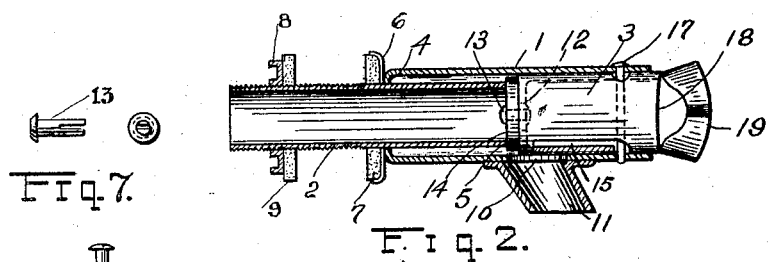
Fig. 2 is a central longitudinal sectional view of the same.
Fig. 7 shows the hollow rivet for securing the washer to the end of the plug.
Figure 8:
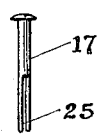
Fig. 8 is a detail view of the pin which extends through the plug.
Figure 4:
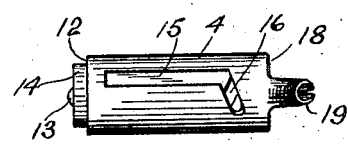
Fig. 4 is a top plan view of the plug shown in Figure 3.
Figure 3:
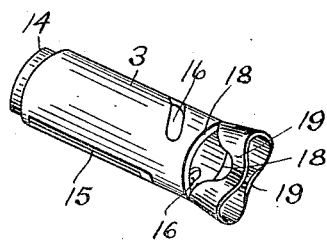
Fig. 3 is a perspective view of the plug shown in Figures 1 and 2.
Figure 5:
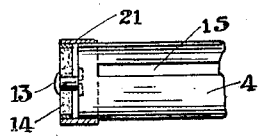
Figures 5 and 6 are detail views showing modified forms of the plug.

Instead of having the washer 14 secured rigidly to the end of the plug as shown in Figures 2, 3 and 4, it may be formed of hard or soft material and be fitted into a thin brass or other metal container shell 21 fitting closely in the inside of the outer member 1 and fitting loosely on the end of plug 3 as shown in Figure 5. This thin metal shell having a close sliding fit in the outer member 1 prevents the liquid from passing along the plug when it is in open position.

Figure 6:
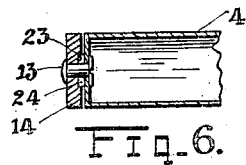

In case it is desired to use a washer of relatively hard material, such as vulcanized fibre, and it is desired to provide against possible leakage about the rivet 13, the washer may be provided on the side next to the end of the plug with an annular recess surrounding the rivet hole, as shown at 23 in Figure 6, into which is inserted a washer 24 of soft leather or the like which will fit the rivet closely.

The tubular or hollow rivet 13 is preferably provided with slits 22 to facilitate its spreading against the front face of the end of the plug.

Having thus described our invention what we claim is:

1. A faucet comprising an outer tubular member formed of straight tubing of uniform diameter, an inner tubular member formed of straight tubing of uniform diameter having its exterior diameter substantially less than the inner diameter of the outer member, extending into the outer member for a substantial distance from its rear end, and having its front end cut off at right angles to its axis the inner end of the outer member being turned inward to fit the exterior diameter of the inner member and secured thereto, and a plug movable within the forward portion of the outer member having at its rear end a washer having a flat rear face adapted to bear against the front end of the inner member.

2. A faucet comprising an outer tubular member formed of straight tubing of uniform diameter, an inner tubular member formed of straight tubing of uniform diameter having its exterior diameter substantially less than the inner diameter of the outer member, extending into the outer member for a substantial distance from its rear end, and having its front end cut off at right angles to its axis the inner end of the outer member being turned inward to fit the exterior diameter of the inner member and secured thereto, and a plug movable within the forward portion of the outer member having at its rear end a washer having a flat rear face adapted to bear against the front end of the inner member and of a diameter greater than the outer diameter of the inner member, and means for forcing the washer against the front end of the inner member.

3. A faucet comprising an outer tubular member formed of straight tubing of uniform diameter, an inner tubular member formed of straight tubing of uniform diameter having its exterior diameter substantially less than the inner diameter of the outer member, extending into the outer member for a substantial distance from its rear end, and having its front end cut off at right angles to its axis the inner end of the outer member being turned inward to fit the exterior diameter of the inner member and secured thereto, a discharge opening in the under side of the outer member forward of the front end of the inner member, and a plug movable within the forward portion of the outer member having at its rear end a washer having a flat rear face adapted to bear against the front end of the inner member and of a diameter greater than the outer diameter of the inner member but less than the inner diameter of the outer member, and means for forcing the washer against the front end of the inner member.

4. A faucet comprising an outer tubular member, an inner tubular member having its exterior diameter substantially less than the inner diameter of the outer member, extending into the outer member for a substantial distance from its rear end, and having its front end cut off at right angles to its axis, a plug formed of straight tubing having its inner end closed movable within the forward portion of the outer member and having at its rear end a washer having a flat rear face adapted to bear against the front end of the inner member and of a diameter greater than the outer diameter of the inner member, and means for forcing the washer against the front end of the inner member comprising a pin carried by the outer member extending through a slot formed in the plug, said slot having a portion thereof arranged at an angle to a plane at right angles to the axis of the plug.

5. A faucet comprising an outer tubular member formed of straight tubing of uniform diameter, an inner tubular member formed of straight tubing of uniform diameter having its exterior diameter substantially less than the inner diameter of the outer member, extending into the outer member for a substantial distance from its rear end, and having its front end cut off at right angles to its axis the inner end of the outer member being turned inward to fit the exterior diameter of the inner member and secured thereto, and a plug formed of straight tubing having its inner end closed movable within the forward portion of the outer member and having at its rear end a washer having a flat rear face adapted to bear against the front end of the inner member and of a diameter greater than the outer diameter of the inner member, and means for forcing the washer against the front end of the inner member comprising a pin carried by the outer member extending through a slot formed in the plug, said slot having a portion thereof arranged at an angle to a plane at right angles to the axis of the plug, and a portion arranged in line with the axis of the plug.

6. A faucet comprising an outer tubular member, an inner tubular member having its exterior diameter substantially less than the inner diameter of the outer member, extending into the outer member for a substantial distance from its rear end, and having its front end cut off at right angles to its axis, a discharge opening in the under side of the outer member and forward of the front end of the inner member, and a plug movable within the forward portion of the outer member having at its rear end a washer having a flat rear face adapted to bear against the front end of the inner member and of a diameter greater than the outer diameter of the inner member but less than the inner diameter of the outer member, and means for forcing the washer against the front end of the inner member comprising a pin carried by the outer member extending through a slot formed in the plug, said slot having a portion thereof arranged at an angle to a plane at right angles to the axis of the plug, and a portion arranged in line with the axis of the plug.

7. A faucet comprising an outer tubular member formed of straight tubing of uniform diameter, an inner tubular member formed of straight tubing of uniform diameter having its exterior diameter substantially less than the inner diameter of the outer member, extending into the outer member for a substantial distance from its rear end, and having its front end cut off at right angles to its axis the inner end of the outer member being turned inward to fit the exterior diameter of the inner member and secured thereto, and a tubular plug formed of straight tubing having its inner end closed movable within the forward portion of the outer member and having at its rear end a washer having a flat rear face adapted to bear against the front end of the inner member and of a diameter greater than the outer diameter of the inner member, and means for forcing the washer against the front end of the inner member comprising a pin carried by the outer member extending through a slot formed in the plug, said slot having a portion thereof arranged at an angle to a plane at right angles to the axis of the plug, and a handle for the plug consisting of a portion of the tube forming the plug partly severed therefrom and forced inward towards the axis of the plug.

In testimony whereof we hereunto affix our signatures.

HENRY G. CORDLEY.
GEORGE R. LONG.